United States Patent
Parnicza et al.

(10) Patent No.: US 6,761,480 B2
(45) Date of Patent: Jul. 13, 2004

(54) THERMOCOUPLE HOLDER FOR FURNACE TUBE

(76) Inventors: Charles William Parnicza, 280 S. Stevendale Rd., Baton Rouge, LA (US) 70819; Charles Wesley Parnicza, 12642 Parnell Ave., Baton Rouge, LA (US) 70815

( * ) Notice: Subject to any disclaimer, the term of this patent is extended or adjusted under 35 U.S.C. 154(b) by 0 days.

(21) Appl. No.: 10/227,771

(22) Filed: Aug. 26, 2002

(65) Prior Publication Data

US 2004/0037350 A1 Feb. 26, 2004

(51) Int. Cl.⁷ ............................ G01K 7/00; G01K 1/14; G01K 1/08
(52) U.S. Cl. ........................ 374/179; 374/147; 374/208; 136/230
(58) Field of Search ............................ 374/147, 208, 374/179, 163; 136/230, 232, 233

(56) References Cited

U.S. PATENT DOCUMENTS

| | | |
|---|---|---|
| 2,048,680 A | 7/1936 | Bird et al. |
| 2,048,681 A | 7/1936 | Davidson et al. |
| 2,151,648 A | 3/1939 | Baker |
| 3,143,439 A | 8/1964 | Hansen |
| 3,901,080 A | 8/1975 | Hilborn |
| 3,907,606 A * | 9/1975 | Chang .................... 136/233 |
| 3,939,554 A | 2/1976 | Finney |
| 4,854,729 A | 8/1989 | Lovato |
| 4,971,452 A | 11/1990 | Finney |
| 5,141,335 A * | 8/1992 | Wannamaker et al. ...... 374/179 |
| 5,172,979 A | 12/1992 | Barkley et al. |
| 5,382,093 A | 1/1995 | Dutcher |
| 5,707,151 A * | 1/1998 | Parker et al. ............... 374/147 |
| 5,993,061 A | 11/1999 | Drouet |
| 6,252,207 B1 * | 6/2001 | Cahill et al. ................ 374/208 |
| 6,334,707 B1 | 1/2002 | Ku |
| 6,558,036 B2 * | 5/2003 | Gysling ..................... 374/147 |

FOREIGN PATENT DOCUMENTS

| | | | | |
|---|---|---|---|---|
| GB | 2062860 A | * | 5/1981 | ................. 374/147 |
| JP | 52077786 A | * | 6/1977 | ................. 374/141 |
| JP | 63063930 A | * | 3/1988 | ................. 374/141 |

* cited by examiner

Primary Examiner—Diego Gutierrez
Assistant Examiner—Mirellys Jagan
(74) Attorney, Agent, or Firm—David L. Ray

(57) ABSTRACT

A thermocouple holder assembly for a furnace tube including a heat sink block for welding to the furnace tube, the heat sink block having a first bore therein for slidably receiving the distal end of an elongated sheathed thermocouple, the heat sink block having a hollow heat sink tube extending from the first bore for receiving a portion of the thermocouple, and a heat shield for welding to the furnace tube having walls for shielding and completely enclosing the heat sink block to shield the heat sink block from ambient heat on the exterior of the heat shield, the heat shield having a cavity therein for receipt of the heat sink block and the heat sink tube and flexible insulation material placed over the heat sink block and the heat sink tube, one of the walls having a second bore extending therethrough to the cavity for slidably receiving the thermocouple, the second bore being positioned in the heat shield wall for alignment with the heat sink tube for conveying the thermocouple through the second bore to the heat sink tube, the heat shield having a third bore extending through one of the walls and intersecting the second bore for receipt of a fastener for placement in the third bore for selectively fastening the thermocouple to the heat shield and for selectively releasing the thermocouple from the heat shield.

7 Claims, 3 Drawing Sheets

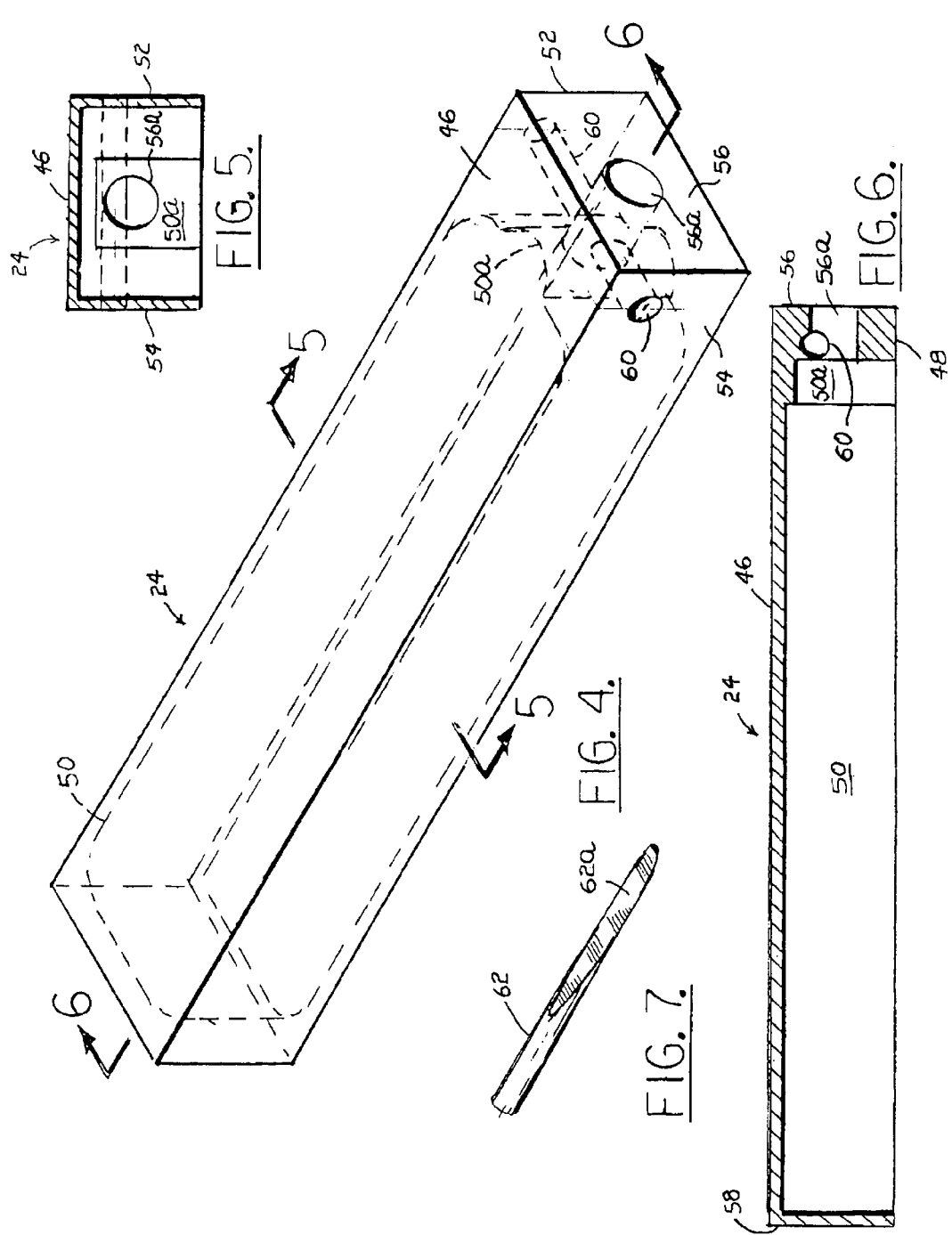

US 6,761,480 B2

THERMOCOUPLE HOLDER FOR FURNACE TUBE

BACKGROUND OF THE INVENTION

1. Field of the Invention

The present invention relates to furnaces or heaters, and more particularly to apparatus for measuring the temperature in furnaces or heaters. Even more particularly, the present invention is related to thermocouples used to measure the temperature of furnace or heater tubes, and apparatus for attaching thermocouples to furnace or heater tubes.

2. Description of the Prior Art

Thermocouples are commonly attached to furnace or heater tubes used in industrial applications to monitor the temperature of the surface of the tube to prevent damage to the tube from excessive temperatures. Such heaters or furnaces are well known in the art and are used to heat fluids flowing through the tubes.

Apparatus for attaching such thermocouples to the surface of furnace or heater tubes are known in the art. Exemplary of the related art are the following U.S. Pat. Nos.: 2,048,680; 2,048,681; 2,151,648; 3,143,439; 3,901,080; 3,939,554; 4,854,729; 4,971,452; 5,172,979; 5,382,093; 5,993,061; and 6,334,707.

It is also known in the art to connect thermocouples directly to heated bodies such as furnace or heater tubes by welding, or peening or swaging into a hole drilled in the heated body or fastener such as a clip connected to the heated body. Shields and insulation are then placed over the thermocouple to prevent damage to the thermocouple and are welded to the heated body.

Commonly, removal and replacement of thermocouples requires welding a new thermocouple directly to a furnace tube or to an apparatus connected to a furnace tube. Damage may be done to the tube during removal of the old thermocouple and the welding of the new thermocouple to the furnace tube, and the tube may require removal from the furnace and re-welding to the furnace after the thermocouple is replaced.

BRIEF SUMMARY OF THE INVENTION

In accordance with the present invention there is provided a thermocouple holder assembly for a furnace tube including a heat sink block for welding to the furnace tube, the heat sink block having a first bore therein for slidably receiving the distal end of an elongated sheathed thermocouple, the heat sink block having a hollow heat sink tube extending from the first bore for receiving a portion of the thermocouple, and a heat shield for welding to the furnace tube having walls for shielding and completely enclosing the heat sink block to shield the heat sink block from ambient heat on the exterior of the heat shield, the heat shield having a cavity therein for receipt of the heat sink block and the heat sink tube and flexible insulation material placed over the heat sink block and the heat sink tube, one of the walls having a second bore extending therethrough to the cavity for slidably receiving the thermocouple, the second bore being positioned in the heat shield wall for alignment with the heat sink tube for conveying the thermocouple through the second bore to the heat sink tube, the heat shield having a third bore extending through one of the walls and intersecting the second bore for receipt of a fastener for placement in the third bore for selectively fastening the thermocouple to the heat shield and for selectively releasing the thermocouple from the heat shield.

BRIEF DESCRIPTION OF THE SEVERAL VIEWS OF THE DRAWINGS

FIG. 4 is a perspective view of the heat shield of the thermocouple holder assembly of Figure of the invention showing a hollow cavity therein in phantom lines;

FIG. 5 is a cross-sectional view of the heat shield of the thermocouple holder assembly of the invention taken along lines 5—5 of FIG. 4;

FIG. 6 is a cross-sectional view of the heat shield of the thermocouple holder assembly of the invention taken along lines 6—6 of FIG. 1;

FIG. 7 is a perspective view, partly cut-away, of the thermocouple pin of the thermocouple holder assembly of the invention;

DETAILED DESCRIPTION OF THE INVENTION

Figure 1:
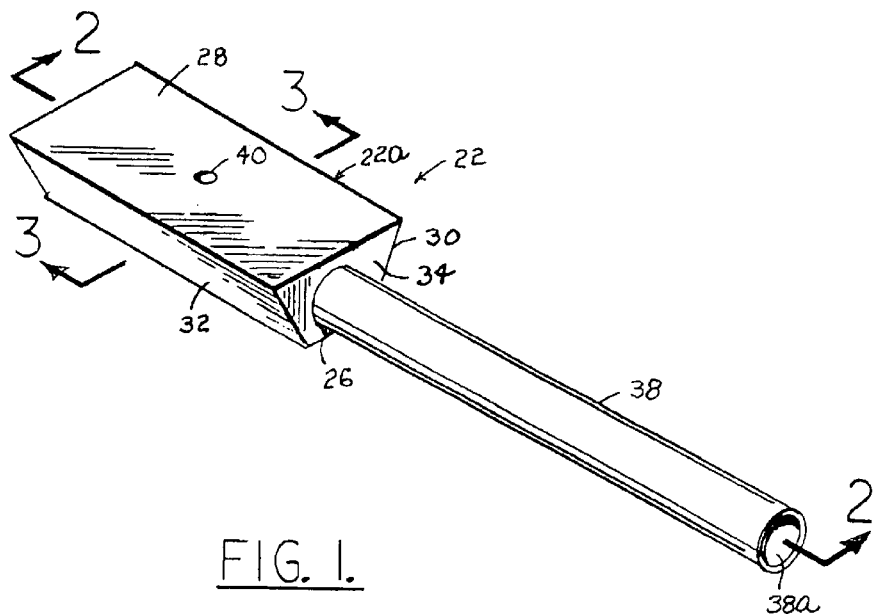
FIG. 1 is a perspective view, partly cut-away, of the heat sink block of the thermocouple holder assembly of the invention.
Figure 8:
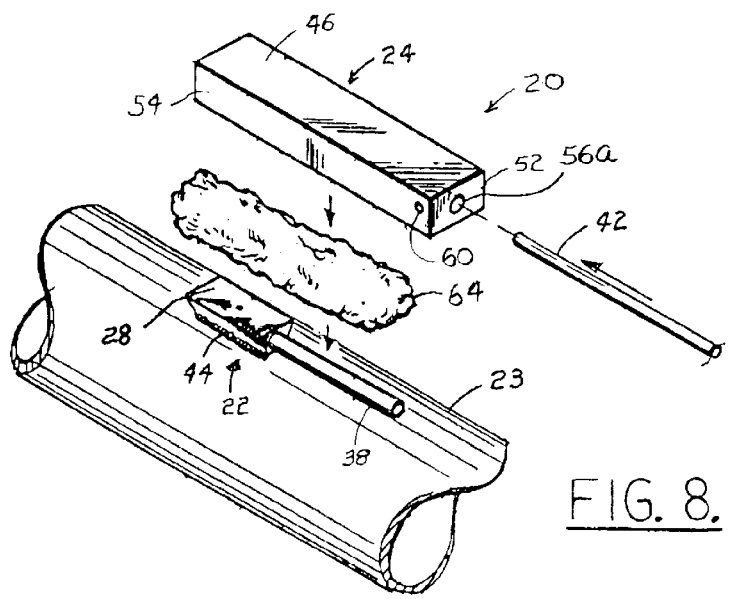
FIG. 8 is an exploded, perspective view, partly cut-away, of the thermocouple holder assembly of the invention and a thermocouple aligned for connection to a furnace tube.
Figure 9:
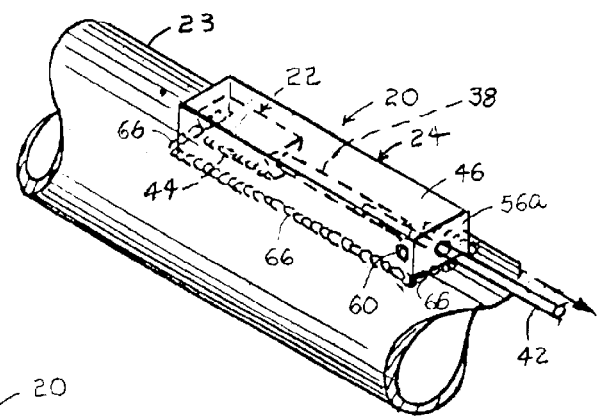
FIG. 9 is a perspective view, partly cut-away, of the thermocouple pin of the thermocouple holder assembly of the invention connected to a furnace tube with a thermocouple therein and the thermocouple pin removed therefrom to enable removal of the thermocouple therefrom in the direction indicated by the arrow.
Figure 10:
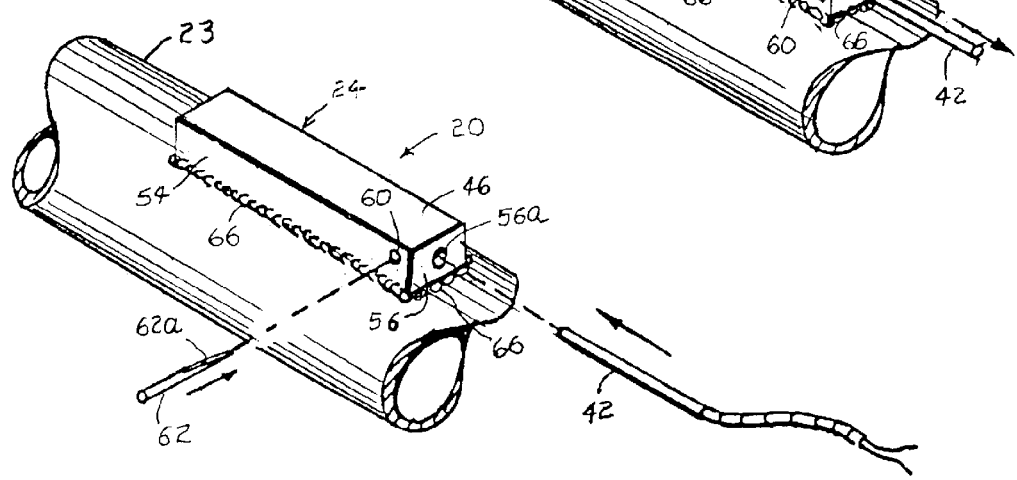
FIG. 10 is a perspective view, partly cut-away, of the thermocouple pin of the thermocouple holder assembly of the invention connected to a furnace tube with a thermocouple aligned for insertion therein in the direction indicated by the arrow adjacent thereto and the thermocouple pin aligned for insertion in the heat shield in the direction indicated by the arrow after insertion of the thermocouple therein.

Referring now to the drawings, in FIGS. 8–10 is shown the thermocouple holder assembly of the invention generally indicated by the numeral 20. Thermocouple holder assembly 20 includes a heat sink block assembly generally indicated by the numeral 22 shown in detail in FIGS. 1–3, and in FIGS. 8–10 connected to furnace or heater tube 23, and a heat shield generally indicated by the numeral 24. The word "furnace" used herein has the same meaning as the word "heater".

Heat sink block assembly 22 includes a solid metallic integrally formed heat sink block generally indicated by the numeral 22a having a flat bottom face 26 which is generally rectangular in shape. If desired bottom face 26 could be slightly concave to fit the curvature of furnace tube 23. Top face 28 is generally rectangular in shape and is located above bottom face 26 parallel thereto. Preferably, top face 28 is the same length as bottom face 26 and is wider than bottom face 26.

Two generally rectangular sloping side faces 30 and 32 connect top face 28 to bottom face 26. Two trapezoidal end faces 34 and 36 are located at each end of heat sink block 22a. If desired, end faces 34 and 36 could be rectangular or any other desired shape which would permit a heat seal with furnace tube 23 sufficient to enable the heat sink block 22a to reach substantially the same temperature as furnace tube 23.

Figure 2:
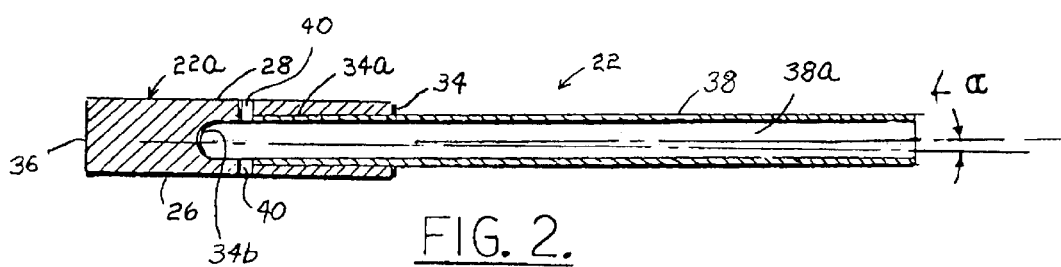
FIG. 2 is a cross-sectional view of the thermocouple holder assembly of the invention taken along lines 2—2 of FIG. 1.
Figure 3:
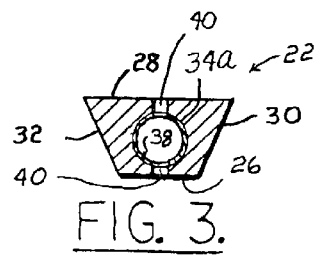
FIG. 3 is a cross-sectional view of the thermocouple holder assembly of the invention taken along lines 3—3 of FIG. 1.

As shown in FIG. 2, end face 34 has a generally horizontal central cylindrical bore 34a therein which extends into the interior of heat sink block 22a generally parallel to bottom face 26, top face 28, and side faces 34 and 36. Hollow heat sink tube 38 is snugly received in bore 34a and is preferably force-fitted therein. Preferably heat sink tube 38 is a metallic material.

Horizontal bore 34a extends from end face 34 to vertical bore 40. Vertical bore 40 extends from the bottom face 26 of heat sink block 22a to the top face 28. Vertical bore 40 may be omitted if desired, but is preferred to enable small amounts of air inside heat sink tube 38 to be vented upward through vertical bore 40 when thermocouple 42 is forced into the interior 38a of heat sink tube 38. Bore 34a continues to end bore 34b located on the other side of vertical bore 40 a slight distance to receive the distal end of thermocouple 42 when the distal end of thermocouple 42 is inserted in heat sink tube 38 and onward into bore 34a and end bore 34b. Thermocouple 42 may be any common sheathed thermocouple well known in the art.

Heat sink block 22a is connected to the surface of furnace tube 23 by welding along the lower edges of sides 30 and 32. Welding beads 44 shown in FIGS. 8 and 9 are welded along the lower edges of sides 30 and 32 of heat sink block 22a to bond heat sink block 22a securely to the outer surface of furnace tube 23. Preferably, two passes of welding beads 44 are made along the entire length of both lower edges of sides 30 and 32 to insure proper heat transfer from the surface of the furnace tube 23 to heat sink block 22a.

As shown in FIG. 8, covering heat sink block 22a and heat sink tube 38 is solid metallic integrally formed heat shield generally indicated by the numeral 20. Heat shield 20 is generally rectangular in shape, having a top rectangular face 46 and a parallel partial bottom face 48 having the lower opening to cavity 50 therein for receipt of heat sink block 22a. Two rectangular parallel side faces 52 and 54 extend downward perpendicular to top face 46 to bottom face 48, and two rectangular end faces 56 and 58 are located at each end of heat shield 24.

As shown in FIGS. 5–10, end face 56 has a generally horizontal cylindrical bore 56a therein which extends into cavity 50 of heat shield 24 generally parallel to bottom face 48, top face 46, and side faces 52 and 54. Cylindrical bore 56a receives thermocouple 42.

Intersecting perpendicularly and horizontally with heat shield bore 56a is horizontal cylindrical fastener bore 60. Cylindrical fastener bore 60 preferably extends completely through heat shield 24 from face 52 to face 54 to receive preferred thermocouple locking pin 62. However, if a bolt, screw, or other fastener were used to lock thermocouple 42 in bore 56a, bore 60 need only to be threaded and extend to intersect bore 56a from one side face 52 and 54.

A semi-cylindrical indention 50a is preferably located at the inner end of bore 56a adjacent to cavity 50, although indention 50a may be omitted if desired. The distal end of tube 38 is received in the bottom of indention 50a when heat shield 24 is placed over heat sink block 22a as shown in FIG. 8 to guide the distal end of tube 38 into alignment with the inner end of bore 56a. If desired, tube 38a may be inclined at an acute angle α with the horizontal as shown in FIG. 2 to facilitate alignment of the distal end of tube 38 with the inner end of bore 56a.

As shown in FIG. 8, after heat sink block 22a has been welded to the outer surface of furnace tube 23, a piece of common flexible insulation material 64 is placed over heat sink block 22a and tube 38, and heat shield 24 is placed thereover. Heat shield 24 is connected to the surface of furnace tube 23 by welding along the lower edges of sides 52 and 54, and along the lower edges of ends 56 and 58 as shown in FIGS. 9 and 10. Welding beads 66 shown in FIGS. 9 and 10 are welded along the lower edges of sides 52 and 54, and along the lower edges of ends 56 and 58 of heat shield 24 to bond heat shield 24 securely to the outer surface of furnace tube 23.

Preferably, a generally cylindrical pin 62 preferably having tapered distal end 62a is utilized to lock thermocouple 42 inside heat shield 24. As shown in FIG. 10, thermocouple 42 is aligned to be inserted in bore 56a and pin 62 is aligned to be inserted in bore 60.

After heat sink block 22a and heat shield 24 are welded to tube 23 with flexibly insulation material 64 therebetween, thermocouple 42 is inserted into bore 56a and onward into tube 34 past vertical bore 40 of heat sink block 22a into the end 34b of bore 34a. Insulation material 64 may be any conventional flexibly insulation material known in the art. The tapered distal end 62a of pin 62 is then inserted into bore 60 in the direction of the arrow adjacent to pin 62 in FIG. 60 and forced therein against shielded thermocouple 42 to lock thermocouple 42 to thermocouple holder assembly 20. As shown in FIG. 9, to remove thermocouple 42 from thermocouple holder assembly 20, thermocouple pin 62 is removed from heat shield 24 and thermocouple 42 is moved away from heat sink block 22a through heat sink tube 38 and through bore 56a of heat shield 24 in the direction of the arrow adjacent to thermocouple 42 in FIG. 9.

The thermocouple holder assembly 20 of the invention eliminates flame impingement under the heat shield 24, and isolates and insulates the heat sink block 22a from the heat shield 24. The heat sink block 22a therefore only senses the temperature of the furnace tube 23 and is not affected by radiant heat within the furnace.

Furthermore, a thermocouple held by the thermocouple holder assembly 20 of the invention is easily removable and replaceable without additional welding. An old thermocouple may be removed and a new thermocouple may be installed during periodic, routine furnace shutdown using the replacement pins and fasteners of the invention. No further welding on tube 23 is necessary once the initial thermocouple holder assembly installation is complete.

Although the preferred embodiments of the invention have been described in detail above, it should be understood that the invention is no sense limited thereby, and its scope is to be determined by that of the following claims:

What is claimed is:

1. A thermocouple holder assembly for a furnace tube comprising:

a. a heat sink block for welding to said furnace tube, said heat sink block having a bore for receiving an elongated sheathed thermocouple, said bore having an open end and a closed distal end for receiving, a distal end of said elongated sheathed thermocouple, said heat sink block having a straight hollow heat sink tube extending from said open end of said bore and partially into said bore for slidably receiving said elongated sheathed thermocouple and guiding said distal end of said elongated sheathed thermocouple into contact with said closed distal end of said bore, said hollow heat sink tube being open at each end, and b. a heat shield for welding to said furnace tube having walls for shielding and completely enclosing said heat sink block and said heat sink tube to shield said heat sink block from ambient heat on the exterior of said heat shield, said heat shield having a cavity therein for receipt of said heat sink block and said straight hollow heat sink tube and flexible insulation material placed over said heat sink block and said straight hollow heat sink tube, one of said walls of said having a first bore extending therethrough to said cavity for slidably receiving said thermocouple, said first bore being positioned in said heat shield wall for alignment with said straight hollow heat sink tube for conveying said sheathed thermocouple through said first bore to said heat sink tube, said heat shield having a second bore extending through one of said walls and intersecting said first bore for receiving a fastener pin having a tapered end for selectively contacting and fastening said sheathed thermocouple to said heat shield and for selectively securing and releasing said thermocouple from said heat shield.

2. The thermocouple holder assembly of claim 1 wherein said heat sink block has a vertical vent bore intersecting said bore for receiving an elongated sheathed thermocouple, said vertical bore extending from said bore to the outside surface of said heat sink block for venting air in said bore for receiving an elongated sheathed thermocouple when said sheathed thermocouple is inserted into said heat sink tube and said bore for receiving an elongated sheathed thermocouple.

3. The thermocouple holder assembly of claim 1 wherein said heat sink block has a flat, generally rectangular bottom face for welding to said furnace tube.

4. The thermocouple holder assembly of claim 3 wherein said bottom face has walls extending upward therefrom for welding to said furnace tube.

5. The thermocouple holder assembly of claim 1 wherein said heat shield has a top rectangular face and a partial rectangular bottom face parallel to said top face containing an opening to said cavity.

6. The thermocouple holder assembly of claim 5 wherein said heat shield has four walls connected at their edges and extending vertically between said top rectangular face and said bottom face.

7. The thermocouple holder assembly of claim 6 wherein a semi-circular indention is located adjacent to said cavity and the interior end of said first bore to facilitate alignment of a distal end of said heat sink tube with said first bore.

\* \* \* \* \*